Dec. 8, 1959     A. ELCE ET AL     2,916,422
EXTRACTIVE DISTILLATION OF FORMALDEHYDE
Filed Jan. 29, 1954
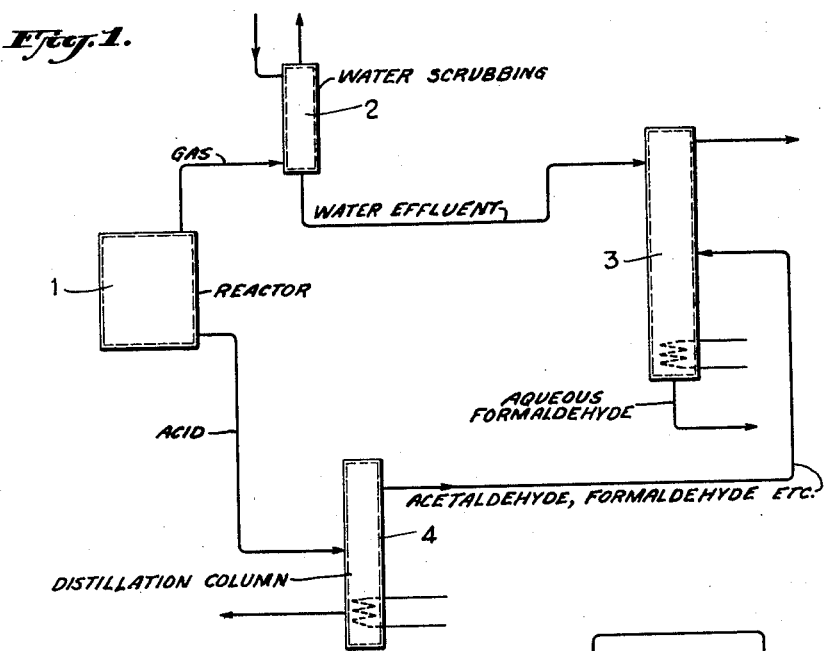
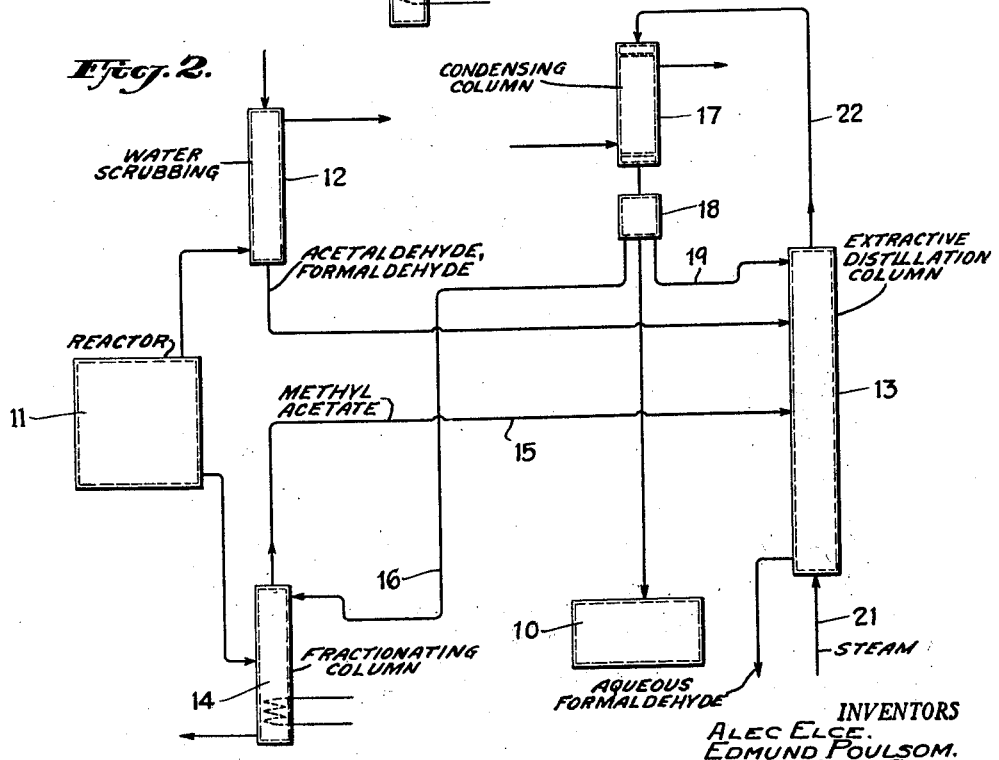
INVENTORS
ALEC ELCE.
EDMUND POULSOM.
BY ERNEST CECIL CRAVEN.
Their ATTORNEYS

United States Patent Office 2,916,422
Patented Dec. 8, 1959

2,916,422

EXTRACTIVE DISTILLATION OF FORMALDEHYDE

Alec Elce, Epsom, and Edmund Poulsom and Ernest Cecil Craven, Hedon, England, assignors to The Distillers Company Limited, Edinburgh, Scotland, a British company Application January 29, 1954, Serial No. 406,953

Claims priority, application Great Britain January 31, 1953

4 Claims. (Cl. 202—39.5)

The present invention relates to improvements in or relating to processes involving the oxidation of acetaldehyde to yield acetic and/or acetic anhydride.

In the course of such processes in order to effect the recovery of the desired acid or anhydride product, the oxidation product is inter alia subjected to a distillation process wherein the lower boiling non-acidic constituents are distilled off as essentially water-free fractions. It has now been found that solid materials are precipitated from these fractions in condensers, coolers, pipelines and plates near the head of the stills, which, although perhaps only small in quantity, cause blockages or affect at least the desired heat transfer.

It has further been found that this undesired deposition of solids can be eliminated or considerably reduced in those still systems, where it would otherwise occur, if the abovementioned distillate is passed directly into another still in which its vapours are subjected to countercurrent extraction by water which is fed towards the top of this still. The deposits hitherto causing blockage are due to paraformaldehyde, and the water extraction of the vapours inter alia serve to remove formaldehyde.

The invention comprises the novel processes and steps of processes, specific embodiments of which are described hereinafter by way of example and in accordance with which we now prefer to practise the invention.

Accordingly, the present invention comprises the step in a process for the oxidation of acetaldehyde comprising passing the oxidation product to a distillation column to remove as overheads the essentially water-free non-acidic products boiling lower than acetic acid and applying these overheads to an extractive distillation with water, preferably a further distillation column wherein water is introduced into said column at or about the head thereof, to strip the formaldehyde from the mixture, and removing the aqueous formaldehyde effluent from the base of the column.

It is preferred to introduce the water a few plates below the head of the second distillation column and to apply a normal reflux so that the few plates above the water feed may be used for separating low boiling constituents for example acetaldehyde, with or without other low boiling organic substances, from water.

The water may be introduced into this second column intermittently although it is preferred to introduce the water continuously. The rate of introduction of the water may vary over a wide range; the optimum rate will depend on the nature, construction and operation of the distillation column. This may be readily determined by calculation from known principles and/or experiment. Desirably the amount of water introduced is such that formaldehyde concentration in the aqueous effluent is not more than about 1%. It is, of course, possible to introduce water at various points of the still, and/or to circulate the aqueous solution in the bottom part of the still, provided some fresh water is fed above the feed point of the organic mixture to be treated. The feed point as well as the quantity of water should be chosen so as to ensure a sufficient stripping of formaldehyde from the rising vapours.

The distillation column employed may be of any of the types known in the art and may comprise an integral column or two or more columns connected together. The column should suitably be of a theoretical efficiency of at least 10 plates and desirably about 30 plates.

It is a special feature of our invention to pass the overheads without condensation directly as vapours into a still where they meet a downward flow of water so as to remove from these vapours the accompanying formaldehyde. In this case the reflux of the first still is removed, and we prefer to apply as reflux for the first still part of the condensate from the second still. Alternatively the first still may be provided with a dephlegmator which causes partial condensation without reduction of the temperature of the liquid substantially below the boiling point.

In the process for the oxidation of acetaldehyde the effluent gases from the reactor may contain acetaldehyde or other valuable materials and it is, therefore, desirable to scrub these effluent gases with water to recover these materials. According to a preferred embodiment the effluent gases from the oxidation reactor are subjected to a water scrubbing and this scrubbing water is thereafter used as the water, supplemented if necessary with fresh water, to the second distillation column.

Thus, for example, in the oxidation of acetaldehyde to acetic acid, the crude acid is distilled in a column so as to separate unchanged acetaldehyde and any light boiling by-products boiling lower than acetic acid, for example methylacetate and acetone, from the acetic acid. The overheads from this column which contain small amounts of formaldehyde, are passed as vapours directly into a distillation column, which is provided with a downward flow of water. Acetaldehyde and the light boiling byproducts leave the top of this column free from formaldehyde and thus do not cause any precipitate on condensation, whilst the formaldehyde leaves the bottom of the column with the waste water. According to a preferred embodiment of the invention in this oxidation process, the water obtained from the scrubbing of the exit gases of the oxidation reactor is applied to the extraction column. The scrubber water contains the absorbed aldehyde and any light boiler, but so little, if any formaldehyde, that the distillate is still free from formaldehyde.

The extraction column may have an additional fractionating section above the feed point for the water. The process may, however, also be arranged so that one column is employed solely for removal of formaldehyde in aqueous solution as a base product, whilst the volatile organic solvents freed from formaldehyde are taken from the head and passed to further columns and the like for separation of water or various fractions as desired. In this method the working of reflux will be restricted and other conditions adjusted to secure the most effective and economical attainment of this one step.

The amount of water may vary over a wide range. Generally we prefer to introduce such an amount that the formaldehyde concentration in the aqueous effluent does not exceed 1%. It is, of course, possible to introduce water at various points of the still, and/or to circulate the aqueous solution in the bottom part of the still, provided some fresh water is fed above the feed point of the organic mixture to be treated.

By way of illustration a simplified layout plan of part of the recovery system of an apparatus for the oxidation of acetaldehyde to acetic acid is shown in Figure 1. Fig. 2 illustrates a layout plan for an alternate embodiment of the recovery system. The exit gases from the reactor 1 are passed to a water scrubbing tower 2 and the aqueous effluent from this tower is applied to the stripping column 3. The volume of aqueous fluid may be reduced or supplemented as is required. The acid product from the reactor 1 is passed to a distillation column 4 and the overheads from this column comprising acetaldehyde, formaldehyde, esters, acetic acid and water supplied to the stripping column 3. The formaldehyde free vapours are taken off from the top of the column and the aqueous formaldehyde effluent removed from the base of the column.

The following examples are given to illustrate the process of the present invention.

EXAMPLE 1

The distillate from a continuous still of 36 plates in which the product of a catalytic oxidation of acetaldehyde containing 85% acetic acid was treated contained 41.0 parts of acetaldehyde, 42.8 parts of methyl acetate, 12.0 parts of acetone, 1.3 parts of acetic acid, 0.9 part of formaldehyde and 2.0 parts of water. This material was used as feed material to a continuous still of 32 plates on to the 15th plate above the reboiler and a water feed on to the 22nd plate above the reboiler.

The heat supplied to the base of the column was adjusted to give a base temperature of about 60° C. so that the base product would be free from acetaldehyde.

The results obtained using various feed rates and reflux ratios are given in Table 1.

Table 1

| Reflux Ratio | 1/1 | 1/1 | 1/1 | 1/1 | 4/1 | 4/1 | 4/1 |
| --- | --- | --- | --- | --- | --- | --- | --- |
| Feed (parts per hour) | 385 | 342 | 342 | 347 | 128 | 162 | 165 |
| Water feed (parts per hour) | 410 | 367 | 360 | 507 | 193 | 180 | 199 |
| Distillate (parts per hour) | 192 | 198 | 202 | 191 | 82 | 82 | 90 |
| Still Head Temp. (° C.) | 33 | 37 | 37 | 34 | 37 | 33 | 37 |
| Percent composition of distillate: | | | | | | | |
| Acetaldehyde | 73.2 | 66.8 | 67.3 | 70.7 | 63.6 | 76.5 | 69.0 |
| Methyl acetate | 23.6 | 30.8 | 33.1 | 25.6 | 35.2 | 17.1 | 29.0 |
| Acetone | 0.8 | 0.8 | 0.7 | 0.5 | 1.1 | 1.1 | 1.2 |
| Formaldehyde | nil | nil | nil | nil | nil | nil | nil |

The base product from the above distillations which had the composition 0.2 part of acetaldehyde, 15.4 parts of methyl acetate, 6.4 parts of acetone, 0.5 part of formaldehyde and 77.5 parts of water was extractively distilled in the same still as the original feed.

The results are given in Table 2.

Table 2

| Reflux Ratio | 1/1 | 1/1 |
| --- | --- | --- |
| Feed (parts per hour) | 512 | 468 |
| Water feed (parts per hour) | 343 | 380 |
| Distillate (parts per hour) | 106 | 98 |
| Still Head Temp. (° C.) | 55.7 | 56.0 |
| Percent Composition of distillate: | | |
| Acetaldehyde | 1.3 | 0.6 |
| Methyl acetate | 66.0 | 64.3 |
| Acetone | 29.7 | 28.6 |
| Formaldehyde | 0.005 | nil |

Operating in this way no solid deposit was formed in any part of the apparatus.

By way of comparison when the starting material was fed to a standard 32 plate column for the purpose of separating substantially the acetaldehyde from the other substances the condenser and upper plates of this still were in less than three hours coated with a solid deposit sufficient to prevent continuation of work. The deposit was very largely paraformaldehyde.

EXAMPLE 2

Feed mixture of the same composition and derivation as that of Example 1 was fed into the same column in the same way as in Example 1, except that the base temperature was maintained over 99° C. so that substantially all the ester and ketone was driven over the still head.

Table 3

| Reflux Ratio | 1/1 | 1/1 | 4/1 |
| --- | --- | --- | --- |
| Feed (parts per hour) | 372 | 383 | 127 |
| Water Feed (parts per hour) | 300 | 450 | 150 |
| Distillate (parts per hour) | 356 | 370 | 117 |
| Head Temp. (° C.) | 49 | 48 | 51 |
| Percent Composition of Distillate: | | | |
| Acetaldehyde | 37.0 | 39.2 | 41.7 |
| Methyl acetate | 43.3 | 44.6 | 43.2 |
| Acetone | 13.0 | 12.7 | 12.5 |
| Formaldehyde | 0.01 | nil | nil |

Alternatively the mixture may be fed into any suitable still (for example a still recovering acetaldehyde and other low boiling organic substances from scrubber water) down which water is flowing in a quantity at least equal to the quantity of formaldehyde found in the liquor.

EXAMPLE 3

A distillate from the same 36 plate column mentioned in Example 1 when working up material from the same source had the average composition acetaldehyde 58.70%; 31.20% methyl acetate; 7.35% acetone, and 2.75% formaldehyde. This was fed on to the 12th plate from the bottom of a still column of 31 plates at the rate of 109 parts per hour. On to the 19th plate from the bottom was fed scrubber liquor obtained from scrubbing the waste gases of the oxidation process and having the composition 4.36% acetaldehyde, 0.20% acetone, 0.81% methyl acetate, 0.46% acetic acid and 94.17% water at the rate of 3470 parts per hour. A pressure of 2.2 atmospheres was maintained on the still, and the column was heated by open steam to maintain a reflux ratio of 8:1.

The distillate was 292 parts per hour and its percentage composition was as follows:

|  | Percent |
| --- | --- |
| Acetaldehyde | 73.6 |
| Methyl acetate | 21.3 |
| Acetone | 5.1 |
| Formaldehyde | 0 |

The effluent was taken off at 4087 parts per hour of the composition:

|  | Percent |
| --- | --- |
| Formaldehyde | 0.07 |
| Acetic acid | 0.39 |
| Water | 99.54 |

No deposition of solid matter occurred in the second still or any of its ancillary pipe work or appendages i.e. condensers or flow meters during a period of nine weeks. After this period however a solid deposit had formed on the walls of the condenser of the first still.

EXAMPLE 4

The apparatus employed in the process of this example is shown in Figure 2. The reactor 11 is arranged as shown, the waste gases being passed to a water scrubber 12 in which the gases are brought into contact with a counter-current flow of water which removes the acetaldehyde, methyl acetate and acetone. The liquid products of the reaction are fed to the fractionating column 14 from which unreacted acetaldehyde and more volatile products are removed overhead as vapours along line 15 to the 12th plate of the extractive distillation column 13 of 31 theoretical plates. The water from the scrubber 12 is fed on to the 19th plate of column 13, and the heat to this column is supplied by live steam introduced at the base by line 21. The vapours from the head of column 13 pass by line 22 into a condenser 17, from which the condensate flows into the divider 18, where the liquid stream is divided into three parts. The first part flows along line 16 to the head of column 14 to act as reflux for this column, the second part flows along line 19 to the head of column 13 for which it acts as reflux, and the third part flows to the storage tank 10.

This apparatus was used for the continuous oxidation of acetaldehyde, the overhead from column 14 having the composition 58.7% acetaldehyde, 31.2% methyl acetate, 7.35% acetone and 2.75% formaldehyde. These overheads were fed to column 13 at the rate of 109 parts per hour, and the liquor from the scrubber 12, having the composition 4.36% acetaldehyde, 0.20% acetone, 0.81% methyl acetate, 0.46% acetic acid and 94.17% water, was fed to the column 13 at the rate of 3470 parts per hour. A pressure of 2.2 atmospheres was maintained in the column 13, the rate of steam heating being such as to maintain a reflux ratio of 8:1.

The distillate from column 13 was taken off at the rate of 292 parts per hour and was of the composition acetaldehyde 73.6%, methyl acetate 21.3%, acetone 5.1%, formaldehyde 0%, and the effluent from this column taken off at the rate of 4087 parts per hour was of the composition formaldehyde 0.07%, acetic acid 0.39% and water 99.54%.

After 12 weeks continuous operation of this plant no solid deposits were found in any parts of the stills or their ancillary equipment.

We claim:

1. In a process for the production of acetic acid by oxidation of acetaldehyde producing such acetic acid containing impurities, the steps which comprise distilling the acetic acid containing formaldehyde and other impurity to separate same as a distillate from the acetic acid, said distillate containing unreacted acetaldehyde, oxidation products thereof and formaldehyde, and subjecting the said distillate in the vapor phase to extractive distillation with water to remove the formaldehyde present in the distillate.

2. A process according to claim 1 wherein the formaldehyde is removed from the distillate as an aqueous solution.

3. A process according to claim 2 wherein the amount of water employed in the extractive distillation is such that the formaldehyde removed as an aqueous solution contains not more than about 1% of formaldehyde.

4. A process according to claim 1 wherein the extractive distillation is carried out in a zone into which water is introduced at a point near the top of the zone.

References Cited in the file of this patent

UNITED STATES PATENTS

| | | |
|---|---|---|
| 1,951,789 | Mueller-Cunradi et al. | Mar. 20, 1934 |
| 2,009,838 | Foster | July 30, 1935 |
| 2,325,379 | Durrum | July 27, 1943 |
| 2,438,300 | Schniepp | Mar. 23, 1948 |
| 2,607,719 | Eliot et al. | Aug. 19, 1952 |
| 2,756,248 | Hujsak et al. | July 24, 1956 |

FOREIGN PATENTS

| | | |
|---|---|---|
| 372,507 | Great Britain | May 12, 1932 |
| 405,719 | Great Britain | Feb. 15, 1934 |
| 682,487 | Great Britain | Nov. 12, 1952 |

OTHER REFERENCES

Ser. No. 385,019, Guinot (A.P.C.), published Apr. 20, 1943.